United States Patent [19]
Bomberger, Jr.

[11] 3,793,071
[45] Feb. 19, 1974

[54] TITANIUM WELDING ELECTRODE
[75] Inventor: Howard B. Bomberger, Jr., Canfield, Ohio
[73] Assignee: RMI Company, Niles, Ohio
[22] Filed: Feb. 24, 1972
[21] Appl. No.: 228,877

[52] U.S. Cl............. 117/206, 117/113, 117/114 C, 117/207
[51] Int. Cl.......................... B23k 35/00, C23g 1/00
[58] Field of Search........117/206, 205, 207, 113, 117/114 C; 219/146

[56] References Cited
UNITED STATES PATENTS

| | | | |
|---|---|---|---|
| 3,702,390 | 11/1972 | Blake | 117/206 |
| 3,574,678 | 4/1971 | Stark | 117/204 |
| 1,977,278 | 10/1934 | Judy | 117/206 |
| 1,294,250 | 2/1919 | Elliott | 117/206 |

Primary Examiner—Alfred L. Leavitt
Assistant Examiner—M. F. Esposito
Attorney, Agent, or Firm—Walter P. Wood

[57] ABSTRACT

A titanium welding electrode which consists of a titanium rod, an oxidation-resistant metal coating on the rod, and an arc-stabilizing additive. The additive is a metal of the group which consists of barium, strontium, cerium and yttrium. Preferably the additive is incorporated in the coating metal, but alternatively may be incorporated in the titanium rod. The invention is an improvement over the electrode covered in U.S. Pat. No. 3,574,678, in which the arc-stabilizing material is applied as a separate coating.

5 Claims, No Drawings

TITANIUM WELDING ELECTRODE

This invention relates to a titanium welding electrode which is an improvement over the electrode shown in Stark U.S. Pat. No. 3,574,678 of common ownership.

The Stark patent shows a titanium welding electrode which has a uniform non-porous coating of a metal which does not absorb oxygen, and an arc-stabilizing coating over the metal coating. The metal coating preferably is aluminum. The arc-stabilizing coating is a halide salt of either an alkali metal, an alkaline earth metal or a rare earth metal. As shown in the examples in the patent, the electrode can be used to produce excellent welds with relative ease. However, there is a problem that the arc-stabilizing coating is fragile and readily breaks off. If this coating is damaged, the quality of welds obtained with the electrode is uncertain. Consequently the electrode must be handled with great care in storage, shipping, etc.

An oject of my invention is to provide an improved titanium welding electrode which retains the advantages of the Stark electrode, yet avoids the need for a fragile arc-stabilizing coating.

A more specific object is to provide an improved titanium welding electrode which has a metal coating similar to the Stark electrode, but in which I incorporate arc-stabilizing additives in the metal, either in the coating or in the titanium itself, and avoid the need for a separate arc-stabilizing coating.

As used in the present specification and claims, the term "titanium" refers to the various titanium-base alloys, as well as the unalloyed or commercially pure metal. My welding electrode consists of a titanium rod which has a uniform, non-porous oxidation-resistant coating of aluminum or an aluminum-base alloy of a thickness of about 0.1 to 5 mils. As contrasted with the Stark electrode, the aluminum coating preferably has incorporated therein about 0.1 to 5 percent by weight of an arc-stabilizing additive. The additive is a metal of the group consisting in order of preference of barium, strontium, cerium and yttrium, two or more of which may be used in combination if desired.

Before preparing the electrode, preferably I dissolve the arc-stabilizing additive in a bath of molten aluminum in the foregoing proportions, and add a suitable flux to cover the bath surface. One example of such a flux consists by weight of 45% KCl 15% Cryolite 35% NaCl 5% $AlF_3$ With the bath at a temperature of about 1,250°F to 1,550°F, or preferably about 1400°F, I immerse the titanium rod for about 10 to 60 seconds, or preferably about 30 seconds. I control the coating thickness by the choice of immersion time, bath temperature and extraction speed. The flux cleans the titanium surface and prevents formation of an oxide skin on the bath surface such as might hinder uniform wetting of the titanium surface. The rod may be of any convenient dimension but commonly is of a length of about 6 to 18 inches and a diameter of about one-sixteenth to three-eighth inch. I choose the exact composition of the titanium to be compatible with the composition of the bodies I plan to weld. I may conduct the coating operation on a continuous length of rod, which I later cut to appropriate lengths, or on individual pieces.

Alternatively I may incorporate the arc-stabilizing additive in the titanium of the rod, and coat such a rod with aluminum. In this event the additive is included in the rod in an amount of 0.05 to 1.0 percent. I have obtained similar benefits in welding by following the latter procedure, but I prefer to incorporate the arc-stabilizing additive in the aluminum coating, since it is much easier to produce and the titanium alloy is not altered by an additional element.

My invention relies on my discovery that the cation, rather than the anion, is the essential component of Stark's arc-stabilizing coating. If the arc-stabilizing coating is omitted from Stark's electrode, the electrode gives unstable arc conditions, with arc voltages ranging from 13 to 25 volts. There are frequent shorts, open circuits, electrode-sticking and large drops of metal transfer. When a barium fluoride coating is added, the voltages are lowered and stabilized at 10 to 13 volts and uniform welding characteristics result. The electrode of my invention achieves similar benefits, but avoids any need for a separate arc-stabilizing coating. Hence my electrode is easily handled, stored or shipped without damaging it. I may follow procedures similar to those described in the Stark patent in welding with my electrode.

I claim:

1. An electrode consisting of a metal rod, the metal of which is titanium, a uniform non-porous coating on said rod of an oxidation-resistant metal, and an arc-stabilizing additive incorporated directly in at least one of said metals, whereby a separate fragile coating of arc-stabilizing material is avoided, said additive being a metal of the group which consists of barium, strontium, cerium, and yttrium.

2. An electrode as defined in claim 1 in which said additive is incorporated in said coating in an amount of 0.1 to 5 percent by weight of the coating.

3. An electrode as defined in claim 1 in which said additive is incorporated in said rod in an amount of 0.05 to 1.0 percent by weight of the rod.

4. An electrode as defined in claim 1 in which said oxidation-resistant metal is of the group which consists of aluminum and aluminum alloys.

5. An electrode as defined in claim 4 in which said additive is incorporated in molten aluminum and the coating is applied to the rod by dipping the rod in a flux-covered bath of aluminum and additive, the bath containing 0.1 to 5 percent by weight additive.

* * * * *